United States Patent [19]

Chan et al.

[11] 4,007,084
[45] Feb. 8, 1977

[54] DRY STRENGTH PAPER AND PROCESS THEREFOR

[75] Inventors: Lock-Lim Chan, Whitby; Arthur Herbert Guitard, Pickering, both of Canada

[73] Assignee: Borden Products Limited, West Hill, Canada

[22] Filed: June 25, 1975

[21] Appl. No.: 590,313

[52] U.S. Cl. .............................. 162/167; 260/64; 260/65
[51] Int. Cl.² .......................................... D21D 3/00
[58] Field of Search .......... 162/168 N, 168 R, 167, 162/164 R; 260/64, 65, 67 R, 67 FP

[56] References Cited

FOREIGN PATENTS OR APPLICATIONS 1,158,076 7/1969 United Kingdom

Primary Examiner—S. Leon Bashore
Assistant Examiner—Peter Chin
Attorney, Agent, or Firm—George A. Kap; George P. Maskas; Daniel D. Mast

[57] ABSTRACT

Paper of high dry strength is produced by forming an aqueous solution of cellulose fibers and adding thereto a polymeric product of acetone, formaldehyde and polyethylene polyamine, which product is prepared at reflux temperature in presence of a catalytic amount of a strong inorganic acid and has a mol ratio of 1:3:0.5, respectively.

15 Claims, No Drawings

DRY STRENGTH PAPER AND PROCESS THEREFOR

This invention relates to paper having dry strength and a process for its manufacture. The paper is made by incorporating a cationic, water soluble or dispersible polymer which is prepared from a polyamine, a ketone, an aldehyde, and a catalytic amount of an inorganic acid.

Dry strength of paper is defined as the strength of the cellulosic web in its normally dry condition. A resin which is used to improve dry strength of paper must fulfill a number of requirements: it should improve the dry strength by at least 10% over the normal dry strength of paper, it should confer a low degree of wet strength and it should not adversely affect the drainage rate of the cellulose web on the paper making machine.

A dry strength additive finds uses in most grades of paper such as linerboard, packaging, towels and tissues. Dry strength additive is particularly useful in enabling paper manufacturing industry to use weaker or recycled fibers. Recycling has been shown to have weakening effects on paper which can be counter balanced by the use of a dry strength additive.

Dry strength additives are especially useful in the manufacture of paper from recycled fibers. It is the need for recycling paper that a suitable dry strength resin should not confer high wet strength to the paper so that no additional equipment and processing is needed for the eventual repulping.

The art of making dry strength paper dates back prior to 1951 when the Azorlosa Canadian Pat. No. 477,265 issued. This patent discloses the use of an anionic copolymer of acrylamide or methacrylamide with acrylic or methacrylic acid together with alum. Pursuant to the Azorlosa's patent, paper of improved dry strength is manufactured by forming an aqueous suspension of cellulose paper making fibers, adding thereto the anionic dry strength resin copolymer and alum, and sheeting the suspension. The resulting paper possesses much better dry strength than normal paper and possesses virtually no wet strength so that it can be easily repulped.

It is a disadvantage of the Azorlosa process, however, that the paper is produced at pH of about 4.5 and the need to control the pH very closely. Paper produced at pH of about 4.5 is significantly acid and undergoes acid tendering on aging. Moreover, paper making systems operating at this pH level impart a significant amount of corrosion to the apparatus under conditions of constant use. As a result, efforts have been made to discover means for increasing the operating pH of paper making systems producing dry strength paper of the type just described without sacrificing the dry strength developed by the resin.

The pertinent prior art known includes the Gardner et al U.S. Pat. No. 3,071,590 and the National Starch British Pat. No. 1,158,076. The Gardner et al patent describes preparation of certain compounds in a two-step synthesis wherein a primary imidazoline salt is initially prepared and then reacted with formaldehyde and a ketone. Gardner et al's compounds are useful as surface active, emulsifying and corrosion inhibiting agents. The British patent discloses preparation of high molecular weight polyamines at a pH of less than 7 using low molecular weight polyamines, aldehydes and ketones or phenols as starting materials. On top of page 2 of the British patent, it is noted that the high molecular weight polyamines are useful as organic intermediates, flocculating agents and as additives in the paper manufacture to improve such properties as pigment retention and wet strength.

The close control of pH described in the prior art has been obviated by the invention described herein which allows manufacture of dry strength paper in a pH range of about 4 to 9, preferably 5.5 to 8, without weakening the resin to cellulose bond. This has been accomplished by the use of a cationic copolymer of acetone, formaldehyde, polyalkylene polyamine with a small, catalytic amount of an inorganic acid.

The preferred reactants herein include acetone, formaldehyde, diethylene triamine and hydrochloric acid. Mol ratio of acetone/formaldehyde/diethylene triamine can vary widely. Using acetone as a basis of 1 mol, amount of formaldehyde can vary from 1.8 to 4 mols, although 3 mols of formaldehyde to 1 mol of acetone is preferred. The amine can vary from 0.1 to 1 mol per mol of acetone, the preferred amount being about 0.5 mol. Amount of the acid can vary from a negligible amount to 0.3 mol per each mol of acetone, although 0.05 mol is preferred. Within these permissible ranges, an increase in the mol ratio of formaldehyde to acetone generally increases the wet and dry strength properties while a decrease in amount of amine, favors the dry strength property. The choice of the mol ratios depends on the desired degree of dry strength improvement and the acceptable level of wet strength for a specific grade of paper.

In addition to acetone, other suitable ketones include such acetone homologs as methyl ethyl ketone, methyl n-propyl ketone, methyl isopropyl ketone, diethyl ketone, hexanone-2, hexanone-3, chloroacetone and bromoacetone. Preferred ketones are unsubstituted and contain from 3 to about 8 carbon atoms per molecule with at least one reactive hydrogen atom at the alpha carbon position.

Other suitable aldehydes in addition to formaldehyde include acetaldehyde, propionaldehyde, n-butyraldehyde, isobutyraldehyde, glyoxal and n-valeraldehyde. Suitable aldehydes contain from 1 to about 5 carbon atoms per molecule.

Hydrochloric acid can be replaced by other strong inorganic acids such as hydrobromic, sulfuric and nitric.

Suitable polyamines, in addition to the preferred diethylene triamine, include alkylene diamines such as ethylene diamine and propylene diamine; and polyalkylene polyamines containing from 2 to 3 carbon atoms in the alkylene moiety and from 2 to 6 amine groups, and preferably from 2 to 5 amine groups. Examples of suitable polyalkylene polyamines include tetraethylene pentamine, triethylene tetramine, diethylene triamine and a commercial product of Union Carbide sold as mixed amines PM-1953 which is a mixture of about ⅓ mol fraction of diethylene triamine and ⅔ mol fraction of triethylene tetramine. Suitable polyamines contain at least two reactive hydrogens which can participate in the condensation reaction with a ketone and an aldehyde. Total carbon atoms per molecule can vary from 2 to 10, preferably from 4 to 8.

The reaction is carried out at reflux temperature of about 95° C although temperatures in the range of 60° to 110° C are suitable to a degree. The reactants are mixed with sufficient water to yield a condensate of about 20% solids concentration. The pH of the reaction mixture must be above 7 and preferably from 8 to 10 although the upper limit is not critical. The reaction is carried out until the polymer reaches at least 10 cps Brookfield viscosity of a 20% solids solution measured at the refluxing temperature of about 95° C with LVF No. 2 spindle at 60 rpm and as close to the gel point as possible. The preferred degree of condensation is represented by Brookfield viscosity of 40 to 60 cps measured at the same conditions. Generally speaking, the reaction can be carried out until the reaction mixture reaches gelation as evidenced by a rapid increase in Brookfield viscosity as measured at 95° C by No. 2 spindle at 60 rpm. If the pH of the reaction mixture is below 8, the desired dry strength of the treated paper is not obtained, as demonstrated in Example IV.

The resin described above is used under normal paper making conditions in amounts required by the paper making industry to achieve its objectives. Generally, the use of 0.1 to 5%, preferably from 0.2 to 2%, of the dry resin on the basis of dry pulp will provide sufficient improvement in bursting and tensile strengths. The resin is preferably added at points in the paper machine where all the cleaning and refining processes have been complete, i.e., refined stock chest, head box, fan pump, machine chest, etc. The resin can improve dry strength of furnishes when the pulp is maintained in the pH range of 4 to 9, depending on the acceptable degree of wet strength. For those desiring a lower degree of wet strength, pH of the pulp should be in excess of 5.5. The resin can confer dry strength to paper and improve drainage of stock on the wire preferably at pH of above 5.5 to 8. Sufficient dry strength improvement can be achieved under normal paper making conditions without post heat curing.

The resin described above can be used with all standard paper making furnishes, including recycled papers. The resin is prepared by charging the following to a reactor with agitation and cooling:
a. polyamine
b. water
c. inorganic acid
d. ketone, and
e. aldehyde Aldehyde, such as 50% formaldehyde in aqueous solution, is added to the reactor with cooling at such a rate that the temperature is not allowed to exceed 40° C. Agitation of the mixture is continued at about 40° C for about one half hour and then, the mixture is heated to reflux and maintained at reflux for about 2 hours. After this period of time, Brookfield 2/60 viscosity of the reaction product is measured every 15 minutes until 30 cps is reached and then it is measured every 5 minutes until 50 cps is reached. Water is added in order to terminate condensation at this point. The condensate is mixed for about one half hour without cooling and then cooled to room temperature.

The papermaking method for utilizing the resin described herein includes the addition of a dilute aqueous solution of the resin directly at a suitable point in the paper making machine prior to web formation. Consistency of the normal paper making aqueous suspensing of the fibrous cellulosic material can vary up to about 10%, however, the preferred range is 0.1 to 5% and depends on individual paper mills. The normal papermaking stock is beaten to a Canadian Standard Freeness in the range of 200 to 650 mls.

The utility of this invention is not limited to the particular type of paper pulp used, and accordingly, this invention may be utilized with the various types of kraft, soda, sulfite pulp, ground wood, and the like, as well as with other chemical and semichemical paper pulps. By the same token, the invention may be utilized with various types of paper products such as paper, linerboard, corrugated paper, molded pulp products, and the like. In all instances, the product produced by this invention is characterized by having an increased dry strength and other improved properties.

Examples are presented below which illustrate preparation of the resin and paper containing such a resin. Results of the tests on the paper treated with the resin reflect its effect on the dry strength of the paper.

EXAMPLE I — Preparation of the Polymer

To a three necked flask equipped with a thermometer, a mechanical stirring device, sampling tube and a condenser, the following were added and mixed:
water — 237.6g
concentrated hydrochloric acid — 2.6g
mixed amine — 27.6g
acetone — 29.6g
formaldehyde — 90.0g The mixed amine is a commercial product supplied by Union Carbide as Mixed Amine PM-1953 which contains approximately 1/3 mol fraction of diethylene triamine and 2/3 mol fraction of triethylene tetramine. Formaldehyde was added as a 50% aqueous solution. The solution was heated gradually to refluxing at about 92° C. The reaction was stopped by adding 387.4 grams of water when it reached a Brookfield viscosity of 60 cps, LVF spindle No. 2 at 60 rpm at 92° C.

The final product has the following properties:
Brookfield viscosity — 14.0 cps (LVF No. 2/60/25° C)
solids — 9.4%
pH — 9.0.

EXAMPLE II — Evaluation of the Polymer

The effect of the additive polymer was evaluated by the tests on paper handsheets made in a laboratory. The general procedures are briefly described as follows as they apply to this and subsequent examples.

A. Pulp Preparation

Commercially available hardwood bleached kraft and bleached sulfite pulps were added in a 1:1 by weight ratio and soaked in water at ambient temperature for at least 4 hours. This furnish, at about 1.6% consistency, was beaten to a Canadian Standard Freeness of 619 ml and the pH was adjusted to 7.0 with diluted hydrochloric acid or sodium hydroxide solution. The furnish was then diluted to a consistency of 0.25% to form the stock solution for making handsheets.

B. Sheet Formation

One liter aliquots of the stock solution were transferred into stainless steel beakers to which different amounts of the resin was added. The resin was added in the weight percent of 0, 0.15, 0.25, 0.50 and 1.0 of dry resin based on dry pulp. Handsheets were made from these aliquots of stock by the use of a Williams Sheet Mould and Williams Sheet Process. The handsheets, which weighed about 2.5 gm/8 × 8 inch sheet, were dried by the use of Emerson Speed Dryer for 3 minutes at 240° F and pressed overnight by a Williams Sheet Press at 100 psi. The handsheets were cured in an oven at 105° C for 10 minutes. The Mullen bursting strength and tensile strength were tested by the use of Perkins hand driven Mullen Tester and a Thwing Albert Tensile Tester, respectively.

The results of the test are summarized in Table 1A:

TABLE 1A

| % Resin | Tensile Strength | | Mullen Strength | |
|---|---|---|---|---|
| | lbs/15mm | % Increase | psi | % Increase |
| 0 | 5.67 | — | 11.6 | — |
| 0.15 | 6.72 | 18.5 | 14.18 | 22.2 |
| 0.25 | 7.16 | 26.3 | 15.55 | 34.1 |
| 0.50 | 7.47 | 31.8 | 17.78 | 53.3 |
| 1.0 | 7.90 | 39.3 | 19.98 | 72.2 |

The polymer described in Example I was again tested by the method described above. The only difference being that unbleached U.S. southern pine, beaten to a Canadian Standard Freeness of 556 ml, was used as the furnish. The results are summarized as follows:

TABLE 1B

| % Resin | Tensile Strength | | Mullen Strength | |
|---|---|---|---|---|
| | lbs/15mm | % Increase | psi | % Increase |
| 0 | 10.60 | — | 31.35 | — |
| 0.25 | 11.93 | 12.5 | 34.29 | 9.38 |
| 0.5 | 12.17 | 14.8 | 39.29 | 25.33 |
| 1.0 | 13.03 | 22.9 | 39.44 | 25.80 |

It should be apparent, on the basis of data presented above, that the use of the resin described herein results in vastly improved dry strength of the treated paper.

EXAMPLE III — Variation of Some Parameters

A number of resins were prepared as described in Example I using various ratios of reactants. The furnish was a 1:1 blend of bleached sulfite and hardwood bleached kraft which was beaten to the Canadian Standard Freeness of 620 mls. The pH of the pulp was adjusted to 7.0 and amount of resin added was 0.75%. The treated paper was cured in 10 minutes at 105° C. Control was untreated paper. Results of the tests performed are listed in Table 2, below.

TABLE 2

| SAMPLE | A:F:DETA | DRY TENSILE (lb/15mm) | WET TENSILE | % WET STRENGTH |
|---|---|---|---|---|
| A | 1:4.0:1 | 8.65 | 1.28 | 14.80 |
| B | 1:3.7:1 | 9.33 | 1.55 | 16.61 |
| C | 1:3.5:1 | 8.03 | 1.39 | 17.31 |
| D | 1:3.2:1 | 9.40 | 1.57 | 16.70 |
| E | 1:3.0:1 | 8.30 | 1.13 | 13.48 |
| Control | on 1st day | 6.90 | 0.39 | 5.65 |
| E | 1:3.0:1 | 8.27 | 1.15 | 13.91 |
| F | 1:3.0:0.8 | 9.07 | 1.45 | 15.99 |
| G | 1:3.0:0.5 | 9.03 | 1.11 | 12.29 |
| H | 1:3.0:0.1 | 7.86 | 0.69 | 8.78 |
| Control | on 2nd day | 7.27 | 0.38 | 5.23 |

The dotted line in the above table separates experimental work carried on two successive days.

Examination of the above table shows that the improvement in wet and dry strength properties of paper depends highly on the mol ratio of the reactants. For example, resin IIIG represents optimization of highest dry strength and lowest wet strength properties.

EXAMPLE IV — Effect of pH

Two additional resins N and O were prepared. Resin N was prepared from the following reactants:

Example IV - Effect of pH

Two additional resins N and O were prepared. Resin N was prepared from the following reactants:

| (a) mixed amine (Union Carbide, PM-1953) | 12.81 | gm |
|---|---|---|
| (b) water | 110.30 | gm |
| (c) concentrated hydrochloric acid | 1.44 | gm |
| (d) acetone | 13.74 | gm |
| (e) formaldehyde (50%) | 41.78 | gm |
| (f) concentrated hydrochloric acid | 7.40 | gm |
| (g) water | 119.92 | gm |

Reagents (a), (b), (c), (d) and (e) were mixed in a way similar to Example I. The pH of the mixture was 8.6. To this mixture, (f) was added in small increment of 1–2 cc until the pH of the solution was 7. The temperature of the solution increased from 17° to 23° C without external heating, indicating an exotherm due to the heat of neutralization. The solution was heated to reflux for 4 hours, as in Example I. The Brookfield viscosity at 80° C was 3 cps (LVF, spindle No. 2 at 60 rpm). Then, (g) was added to stop the reaction. The final product had the following properties:

| % solids | 11.38 |
|---|---|
| Brookfield viscosity LVF No. 2/60/25° C | 5 cps |
| pH | 6.8 |

Resin O was prepared in the same manner as resin N except that amount of reactant (f), concentrated hydrochloric acid, was 17.38 grams. The pH of the reaction mixture was 2.5. The product had the following properties:

| % solids | 11.6 |
|---|---|
| Brookfield viscosity LVF No. 2/60/25° C | 5.0 |
| pH | 2.8 |

Resin of Example I and resins N and O were tested as in Example II to evaluate effect of pH of the pulp on dry and wet strength properties of the paper. The furnish was repulped unbleached kraft boxes beaten to CSF of 581 ml and had a consistency of 0.25%. The pH of the pulp was adjusted to 7.0, 6.0 and 5.0 with diluted sulfuric acid or sodium hydroxide solution. Amount of resin used was 0.5% based on dry pulp. Tensile strength as well as Mullen strength, measured in psi, for the paper samples are tabulated below:

TABLE 3

| Resin | pH 7.0 | | | pH 6.0 | pH 5.0 | | |
|---|---|---|---|---|---|---|---|
| | Mullen | Tensile Dry | Wet | Mullen | Mullen | Tensile Dry | Wet |
| no resin | 25.3 | 12.9 | 1.05 | 26.6 | 27.8 | 13.0 | 0.93 |
| resin of Example I | 29.1 | 14.6 | 1.29 | 30.0 | 31.4 | 15.0 | 1.25 |
| resin N | 25.7 | 12.9 | 1.11 | 26.2 | 26.2 | 13.4 | 1.07 |
| resin O | 25.6 | 13.1 | 0.99 | 25.6 | 26.2 | 14.0 | 1.08 |

The data in the above table demonstrates superior results imparted by the resin of Example I, which had a pH above 8, versus resins N and O with respective pHs of 6.8 and 2.8.

The appended claims cover the invention described and illustrated herein. Many modifications may become apparent to those skilled in the art and it is intended to cover such modifications if they are within the spirit of our invention. An example of such a modification is the use of additional monomer or monomers which do not change the character of the resin described herein for its intended function.

We claim:

1. A process for the manufacture of paper of improved dry strength and negligible wet strength comprising forming an aqueous suspension of fibrous cellulosic material containing a polymeric reaction product of a ketone, aldehyde and a polyamine in sufficient amount to impart the desired dry strength to the paper; the mol ratios of the reactants being from 1.8 to 4 mols of the aldehyde and from 0.1 to 1 mol of the amine per mol of the ketone; and the reaction to form the product is carried out at pH of 8 to 10.

2. Process of claim 1 including the steps of sheeting the cellulosic material to form a web and drying the web; the ketone is selected from ketones containing from 3 to 8 carbon atoms per molecule with at least one reactive hydrogenation at the alpha carbon position; the aldehyde contains from 1 to 5 carbon atoms; and the polyamine is selected from alkylene diamines and polyalkylene polyamines containing from 2 to 10 carbon atoms per molecule, from 2 to 3 carbon atoms in the alkylene moiety and from 2 to 6 amine groups; the reaction product is prepared in the presence of a catalytic amount of a strong inorganic acid in an aqueous medium.

3. Process of claim 2 wherein the aqueous suspension of cellulosic material is at pH of 4 to 9 and amount of the polymeric reaction product is from 0.1 to 5%, based on the dry weight of the fibrous cellulosic material; Brookfield viscosity of a 20% solids solution of the reaction product is from 10 cps measured on an LVF No. 2 spindle at 60 rpm and at about 95° C and up to the vicinity of its gelation point.

4. Process of claim 3 wherein amount of the reaction product is from 0.2 to 2% and Brookfield viscosity of the 20% solution thereof is 40 to 60 cps, measured at the same conditions.

5. Process of claim 4 wherein the ketone is acetone, the aldehyde is formaldehyde and the polyamine is polyethylene polyamine containing from 2 to 5 amine groups; amount of the acid used in the reaction being up to about 0.3 of a mol per mol of acetone.

6. Process of claim 5 wherein the molar ratio of reactants is 3 mols of formaldehyde, 0.5 mol of polyethylene polyamine and 0.05 mol of acid per mol of acetone.

7. Process of claim 6 wherein the acid is hydrochloric acid and the reaction product being formed at reflux temperature.

8. Paper having improved dry strength and negligible wet strength comprising fibrous cellulosic material and a polymeric reaction product of a ketone, aldehyde and a polyamine in sufficient amount to impart the desired dry strength to the paper; the mol ratios of the reactants being from 1.8 to 4 mols of the aldehyde and from 0.1 to 1 mol of the amine per mol of the ketone; and the reaction to form the product is carried out at pH of 8 to 10.

9. Paper of claim 8 wherein the reaction product is in an aqueous solution wherein the ketone is selected from ketones containing from 3 to 8 carbon atoms per molecule with at least one reactive hydrogen at the alpha carbon position; the aldehyde contains from 1 to 5 carbon atoms; and the polyamine is selected from alkylene diamines and polyalkylene polyamines containing from 2 to 10 carbon atoms per molecule, from 2 to 3 carbon atoms in the alkylene moiety and from 2 to 6 amine groups.

10. Paper of claim 9 wherein amount of the polymeric reaction product is from 0.1 to 5%, based on the dry weight of the fibrous cellulosic material; Brookfield viscosity of a 20% solids solution of the reaction product being from 10 cps measured on an LVP No. 2 spindle at 60 rpm and at about 95° C up to the vicinity of its gelation point.

11. Paper of claim 10 wherein amount of the reaction product is from 0.2 to 2% and Brookfield viscosity of the 20% solution thereof is 40 to 60 cps, measured at the same conditions.

12. Paper of claim 11 wherein the ketone is acetone, the aldehyde is formaldehyde and the polyamine is polyethylene polyamine containing from 2 to 5 amine groups; amount of the acid used in the reaction being up to about 0.3 of a mol.

13. Paper of claim 12 wherein the molar ratio of reactants is 3 mols of formaldehyde, 0.5 mol of polyethylene polyamine and 0.05 mol of acid.

14. Paper of claim 13 wherein the acid is hydrochloric acid and the reaction product is formed at reflux temperature.

15. Paper of claim 14 wherein the reaction product is substantially uniformly dispersed throughout the cellulosic material.

* * * * *